United States Patent
Liebsch

(10) Patent No.: US 11,362,862 B2
(45) Date of Patent: Jun. 14, 2022

(54) METHOD AND SYSTEM FOR OPERATING NETWORKS WITH DATA-PLANE AND CONTROL-PLANE SEPARATED NETWORK FUNCTIONS

(71) Applicant: NEC Laboratories Europe GmbH, Heidelberg (DE)

(72) Inventor: Marco Liebsch, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/772,104

(22) PCT Filed: Jun. 13, 2016

(86) PCT No.: PCT/EP2016/063506
§ 371 (c)(1),
(2) Date: Apr. 30, 2018

(87) PCT Pub. No.: WO2017/071834
PCT Pub. Date: May 4, 2017

(65) Prior Publication Data
US 2018/0316521 A1    Nov. 1, 2018

(30) Foreign Application Priority Data

Oct. 30, 2015  (EP) .................................... 15192412

(51) Int. Cl.
*H04L 12/46*      (2006.01)
*H04L 12/721*     (2013.01)
(Continued)

(52) U.S. Cl.
CPC .......... *H04L 12/4633* (2013.01); *H04L 45/38* (2013.01); *H04L 45/586* (2013.01);
(Continued)

(58) Field of Classification Search
CPC ... H04L 12/4633; H04L 45/38; H04L 45/586; H04L 45/745; H04L 45/748; H04L 47/122; H04L 47/745; H04L 2012/4629
See application file for complete search history.

(56) References Cited

U.S. PATENT DOCUMENTS 8,724,591 B2 * 5/2014 Jin ........................ H04W 36/22
                                                370/331
8,787,303 B2 * 7/2014 Leung ................. H04L 12/4633
                                                370/330
(Continued)

OTHER PUBLICATIONS

Tomovic Slavica et al: "SDN Based Mobile Networks: Concepts and Benefits", Wireless Personal Communications, Springer, Dordrecht, NL, vol. 78, No. 3, Jul. 11, 2014 (Jul. 11, 2014), pp. 1629-1644, XP035381364.

(Continued)

*Primary Examiner* — Huy D Vu
*Assistant Examiner* — Bailor C. Hsu
(74) *Attorney, Agent, or Firm* — Leydig, Voit & Mayer, Ltd.

(57) ABSTRACT

A method for operating a network that includes network functions that have a data-plane separated from a control-plane is provided. The network function of the network functions include network function components. The network function components include a control plane function and data plane functions. During runtime and in case of a predefined state of a first data plane function of the data plane functions, an existing subscription context of the first data plane function and associated data-plane traffic are offloaded to a second data plane function of the data plane functions.

20 Claims, 8 Drawing Sheets

(51) Int. Cl.
*H04L 12/713* (2013.01)
*H04L 12/803* (2013.01)
*H04L 12/745* (2013.01)
*H04L 45/00* (2022.01)
*H04L 45/586* (2022.01)
*H04L 45/748* (2022.01)
*H04L 47/74* (2022.01)
*H04L 47/122* (2022.01)
*H04L 45/745* (2022.01)

(52) U.S. Cl.
CPC .......... *H04L 45/745* (2013.01); *H04L 45/748* (2013.01); *H04L 47/122* (2013.01); *H04L 47/745* (2013.01); *H04L 2012/4629* (2013.01)

(56) References Cited

U.S. PATENT DOCUMENTS

| | | | | |
|---|---|---|---|---|
| 8,831,014 B2* | 9/2014 | Koodli | .................... | H04L 12/14 370/401 |
| 8,879,551 B2* | 11/2014 | Anthony, Jr. | ..... | H04W 28/0231 370/389 |
| 8,885,536 B2* | 11/2014 | Horn | .................... | H04W 76/10 370/312 |
| 9,003,057 B2* | 4/2015 | Mahaffey | ................ | H04L 67/14 709/238 |
| 9,006,256 B2* | 4/2015 | Matsui | .................... | A61K 31/47 514/266.2 |
| 9,066,256 B2* | 6/2015 | Huang | .................... | H04L 47/122 |
| 9,130,867 B2* | 9/2015 | Karino | .................... | H04L 49/70 |
| 9,271,316 B2* | 2/2016 | Bakker | ................ | H04W 76/11 |
| 2011/0122845 A1* | 5/2011 | Meirosu | ................ | H04L 67/14 370/332 |
| 2011/0252477 A1* | 10/2011 | Sridhar | ................ | H04W 24/02 370/237 |
| 2012/0082161 A1* | 4/2012 | Leung | .................... | H04W 48/16 370/392 |
| 2012/0224536 A1* | 9/2012 | Hahn | ...................... | H04L 45/72 370/328 |
| 2012/0269134 A1* | 10/2012 | Jin | ........................ | H04W 36/22 370/328 |
| 2013/0163594 A1* | 6/2013 | Sharma | ................... | H04L 45/66 370/392 |
| 2014/0022900 A1* | 1/2014 | Salot | ................ | H04W 28/0284 370/235 |
| 2014/0204909 A1* | 7/2014 | Cheng | ................... | H04W 8/082 370/331 |
| 2014/0233384 A1* | 8/2014 | Howard | ........... | H04W 28/0289 370/235 |
| 2014/0370896 A1* | 12/2014 | Ganapathy | ............ | H04W 36/08 455/436 |
| 2015/0180783 A1* | 6/2015 | Crasta | ................ | H04L 47/2483 370/235 |
| 2015/0181491 A1* | 6/2015 | Van Phan | ............. | H04W 28/08 370/331 |
| 2016/0100330 A1* | 4/2016 | Broustis | ............. | G06F 9/45558 370/237 |
| 2016/0359947 A1* | 12/2016 | Rao | ........................ | H04L 67/025 |
| 2018/0295138 A1* | 10/2018 | Harris | .................. | H04L 63/20 |

OTHER PUBLICATIONS

Sharon Barkai et al: "Software defined flow-mapping for scaling virtualized network functions", Hot Topics in Software Defined Networking, ACM, 2 Penn Plaza, Suite 701 New York NY 10121-0701 USA, Aug. 16, 2013 (Aug. 16, 2013), pp. 149-150, XP058030708.

\* cited by examiner

METHOD AND SYSTEM FOR OPERATING NETWORKS WITH DATA-PLANE AND CONTROL-PLANE SEPARATED NETWORK FUNCTIONS

CROSS-REFERENCE TO PRIOR APPLICATIONS

This application is a U.S. National Phase Application under 35 U.S.C. § 371 of International Application No. PCT/EP2016/063506, filed on Jun. 13, 2016, and claims benefit to European Patent Application No. EP 15192412.3, filed on Oct. 30, 2015. The International Application was published in English on May 4, 2017 as WO 2017/071834 A1 under PCT Article 21(2).

FIELD

The present invention relates to a method for operating a network with data-plane/control-plane separated network functions.

The present invention further relates to a network for operating a network with data-plane/control-plane separated network functions.

BACKGROUND

Software Defined Networking (SDN) and Network Function Virtualization (NFV) are being adopted in various concepts and products for information and communication technology (ICT). For the next generation of fixed/mobile core networks, the separation of control-plane functions from data-plane nodes serves as enabler for flexible deployments, e.g. the instantiation of control-plane functions in a cloud network, whereas data-plane instances can be used on different places in the network topology. The separation of the control-plane from the data-plane can be accomplished in different ways, either keeping a direct protocol interface between control-plane functions and data-plane functions, or placing an additional network controller in between the control-plane functions and the actual data-plane node. In such case, the network controller, e.g. an SDN controller, can hold the logic to control the state in the network, whereas it can expose an abstract interface towards its applications, i.e. the control-plane functions.

Such functional decomposition is in particular useful for gateways, which can hold control-plane (C-Plane) and data-plane (D-Plane) functions in a single node. The decomposition of control- and data-plane functions are currently being discussed for becoming a standard for fixed line network components, such as the Customer Premises Equipment (CPE) and mobile communication network components, such as the gateways, which serve as mobility and session anchors and perform traffic forwarding between gateways on the data-plane using encapsulation.

SUMMARY

Embodiments of the present invention provide a method for operating a network having data-plane/control-plane separated network functions. A network function of the network functions include network function components. The network function components include a control plane function and data plane functions. During runtime and in case of a predefined state of a first data plane function of the data plane functions, an existing subscription context of the first data plane function and associated data-plane traffic are offloaded to a second data plane function of the data plane functions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention relate to a method for operating a network with data-plane/control-plane separated network functions. The network function includes one or more network function components (NFCs), the NFCs having at least one control plane function (CPF) and at least one data plane function (DPF). During runtime, and in case of an overload of a first DPF, at least one existing subscription context (SC), of the first DPF is offloaded to a second DPF. The predefined state may represent an overload of the first.

The present even further relates to non-transitory computer readable medium storing a program causing a computer to execute a method for operating a network with data-plane/control-plane separated network functions.

Although applicable in general to any kind of data-plane/control-plane separated networks, the present invention will be described with a regard to Software-Defined Networks (SDNs) and Network Function Virtualizations (NFVs).

Although applicable to physical networks in general, the present invention will be described with regard to an Evolved Packet Core (EPC.)

Conventional products for the Evolved Packet Core (EPC) virtualize EPC components, such as the Mobility Management Entity (MME), or the Packet Data Network (PDN) Gateways (PGW) and Serving Gateway (SGW). Conventionally, such virtualized network functions (VNF) are split into multiple dependent VNF components (VNFC). This allows scaling of VNFs by adding (scale-out) or removing (scale-in) VNFCs to a VNF to add/remove processing functions and associated capacity. The scaling process is intrinsic to the VNF and transparent to other virtualized EPC network functions.

Figure 1:
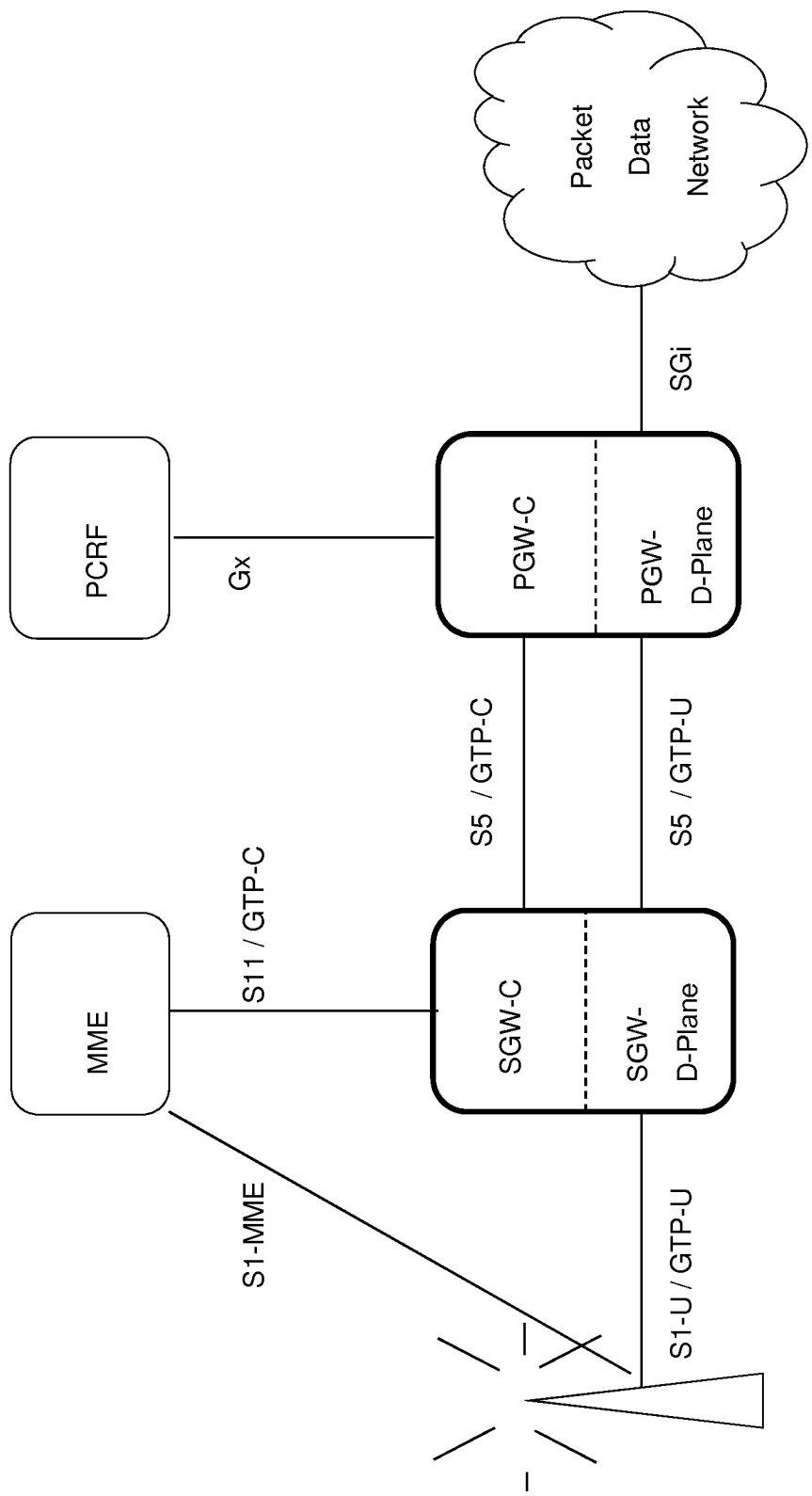
FIG. 1 illustrates an evolved packet system and its corresponding network function and reference points.
Figure 2:
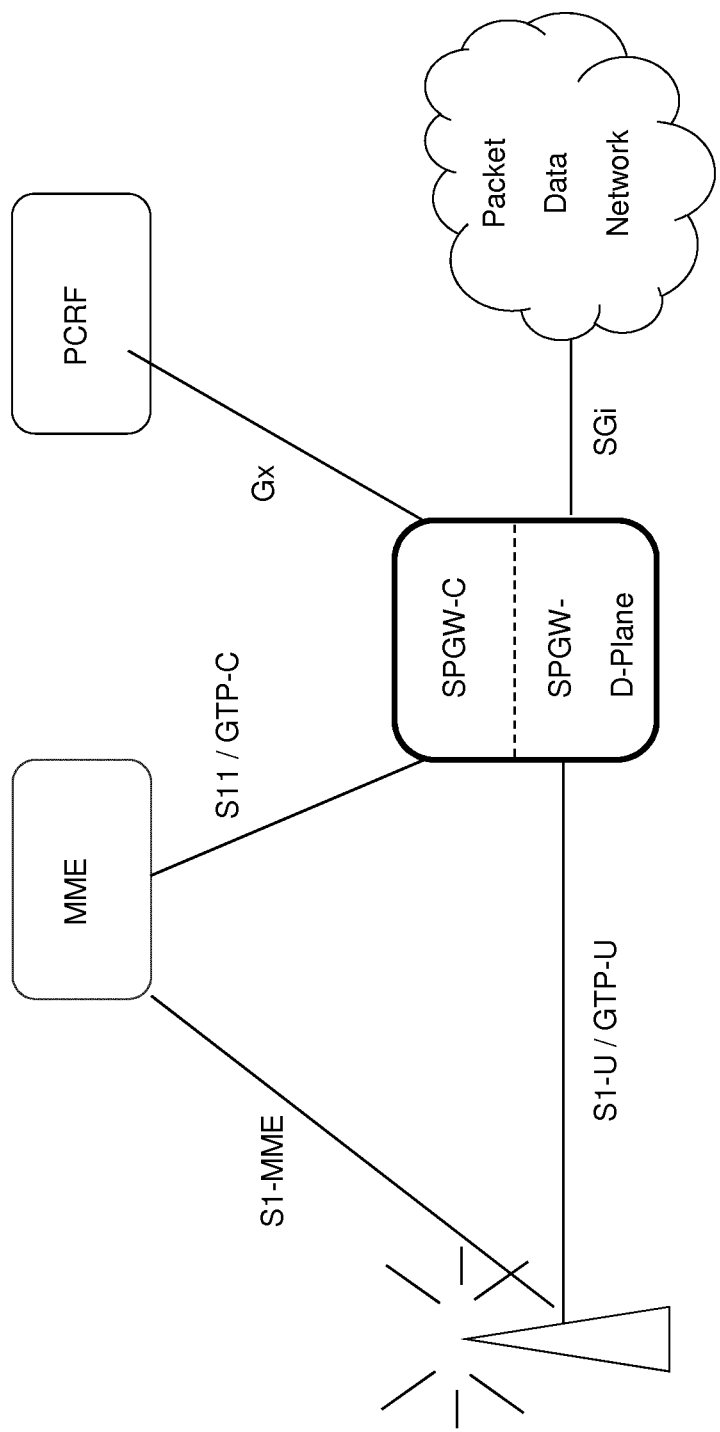
FIG. 2 illustrates another evolved packet system with network functions and reference points.

Following the separation of control from data-plane functions, EPC gateways, such as the PGW and the SGW, can have one or more C-Plane functions, which represent protocol endpoints as per the 3GPP architecture. As example, a conventional PGW C-Plane VNF (PGW-C) terminates protocols which apply to the 3GPP reference points, e.g. the reference points on the Gx interface towards the Policy and Charging Rules Function (PCRF), whereas the PGW dataplane terminates the S5 reference point towards the SGW as shown in FIG. 1. Deployment of combined PGW and SGW as SPGW are also known as shown in FIG. 2.

Figure 3:
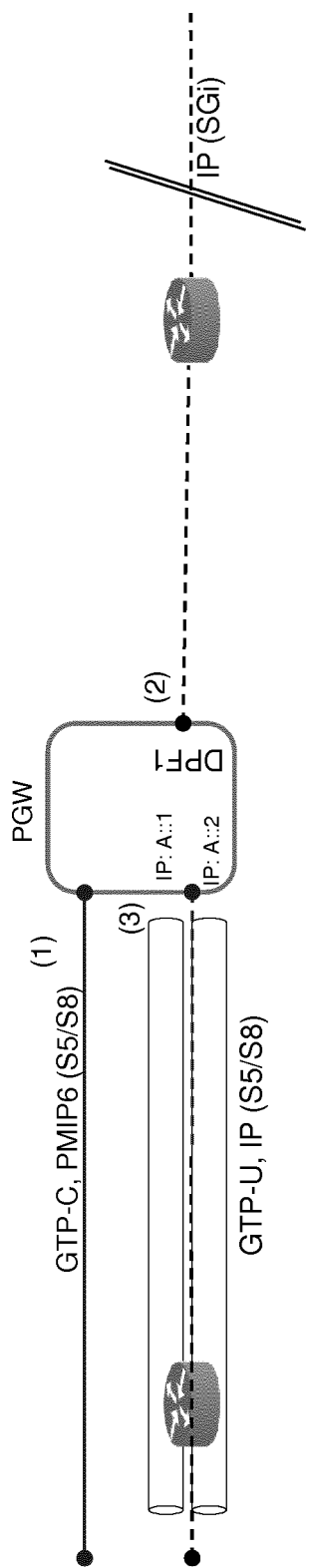
FIG. 3 illustrates in detail part of the system of FIG. 2.

Depicting a conventional PGW as an example shown in FIG. 3, besides the Gx reference point, the network function terminates the S5 Control-Plane and the S5 data-plane towards the SGW, as well as the SGi data-plane towards the packet data network. The S5 data-plane utilizes IP/GRE or GTP-U tunneling to forward packets on the D-Plane between the PGW and an SGW.

As per the 3GPP specification, an EPC gateway can terminate data-plane tunnels on multiple IP addresses, e.g. to enable load balancing of D-Plane traffic between different interfaces of the PGW. Which IP address to use for serving as local data-plane endpoint may be determined by the PGW internally and signaled towards the remote endpoint via the C-plane, e.g. utilizing GTP-C or Proxy Mobile IPv6 (PMIPv6).

The same applies conventionally to the SGW, which terminates the C-Plane towards the Mobility Management Entity (MME) on the S11 reference points and the S1-U tunnels towards the radio base station.

On the SGi reference point towards the packet data network, the PGW proxies a registered mobile device's data-plane. The PGW captures or receives packets destined to the mobile device and forwards them to the registered SGW by means of a tunnel.

Figure 4:
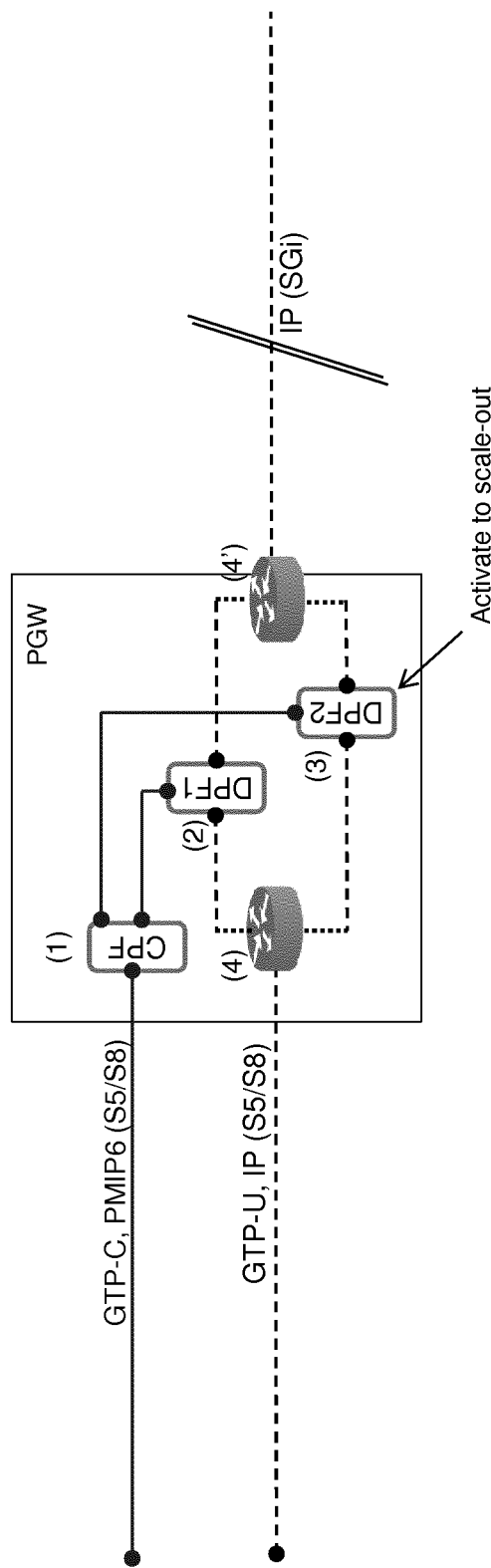
FIG. 4 illustrates part of the system of FIG. 2 with two data plane functions.

The virtualization of EPC gateways is conventionally accomplished according to decomposition of the gateway into smaller functions, e.g. Control- and data-plane functions as shown in FIG. 4.

FIG. 4 depicts the Control-Plane Function (CPF) to terminate the control-plane reference points to other network functions, whereas it controls the configuration of one or multiple Data-Plane Functions (DPFs) that serve the data-plane of the PGW: Scaling the data-plane can be accomplished by adding and removing DPF instances. As example, to scale-out, a PGW can initiate the instantiation of an additional DPF2 instance to complement an already utilized DPF1 instance. New registrations, which are signaled to the PGW on the C-Plane could be assigned to the new instance DPF2 to serve the new user equipment's data-plane.

Figure 5:
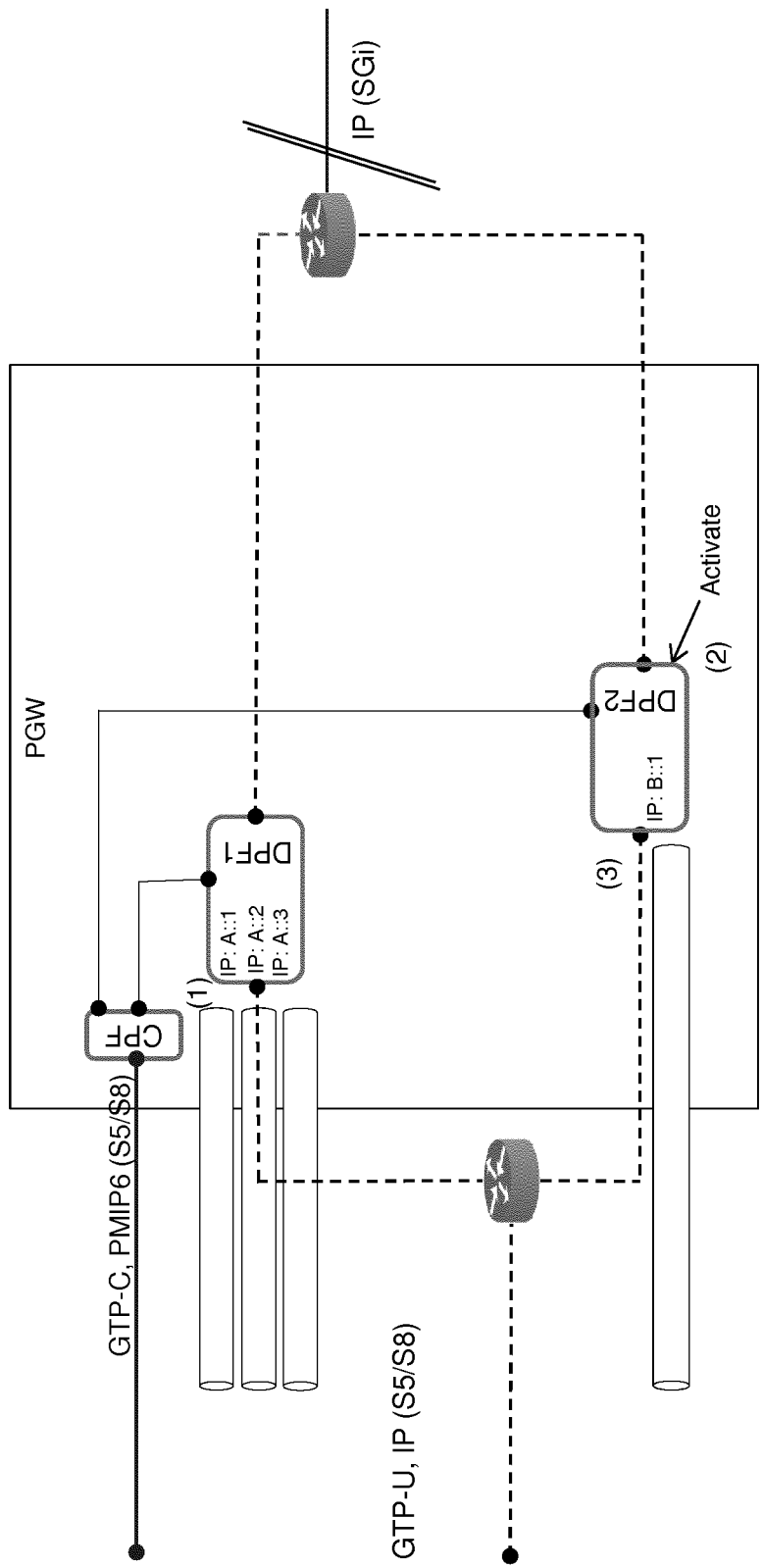
FIG. 5 illustrates an offload in an evolved packet core system.

FIG. 5 depicts exemplarily how a CPF conventionally distributes load during registration of new subscribers between multiple instances of a DPF. In addition, the CPF can choose between multiple IP addresses on a particular DPF to serve as tunnel/forwarding endpoint, e.g. to serve as GTP-U endpoint. Bearers of a registered subscriber may then share a GTP-U endpoint with the chosen IP address. As exemplarily depicted in FIG. 5, DPF1 distributes load of GTP-U tunnels between three IP addresses, A::1, A::2 and A::3, where A:: represents the IP address prefix of the network where the DPF1 is located, and A::1 represents the complete address of one IP address (prefix+suffix) as assigned to an interface of DPF1. The newly instantiated DPF2 serves an IP address in a different network with prefix B::. Delivery of downlink and uplink packets to the PGW's DPFs follows the local routing/switching policies of the local transport network nodes (4') and (4) respectively, as labelled in FIG. 4.

Such a conventional scale-out task is suitable to adapt slowly to the network demand according to the load situation. In some cases, e.g. during certain unexpected events (disaster event), the load of a utilized DPF (i.e. DPF1 in FIG. 4) can increase quickly as subscriptions, which utilize a particular DPF, cause unexpected Data-plane load. This can result in an unexpected overload and failure of a single DPF.

One of the problems addressed by embodiments of the invention is therefore to reduce or avoid overload of DPFs. A further problem addressed by embodiments of the present invention is to enable fast scaling and reliable data traffic in particular without breaking ongoing data sessions i.e. support session continuity, and avoiding or reducing packet losses.

In at least one embodiment, the present invention provides a method for operating a network with data-plane/control-plane separated network functions, wherein a network function comprises one or more network function components, 'NFC', the NFC comprising at least one control plane function, 'CPF' and at least one data plane function, 'DPF', wherein during runtime and in case of a predefined state of a first DPF, '1-DPF', at least one existing subscription context, 'SC', of said 1-DPF and associated data-plane traffic is offloaded to a second DPF, '2-DPF', wherein the predefined state may represent an overload of the 1-DPF.

In at least one further embodiment the present invention provides a network being operated with data-plane/control-plane separated network functions, wherein the network functions comprise one or more network function components, 'NFC', the NFC comprising at least one control plane function, 'CPF' and at least one data plane function, 'DPF', wherein during runtime and in case of a predefined state of a first DPF, '1-DPF', at least one existing subscription context, 'SC', of the 1-DPF and associated data-plane traffic is offloaded to a second DPF, '2-DPF', wherein the predefined state may represent an overload of the 1-DPF.

In at least one further embodiment the present invention provides a non-transitory computer readable medium storing a program causing a computer to execute a method for operating a network with data-plane/control-plane separated network functions, wherein the network functions comprise one or more network function components, 'NFC', the NFC comprising at least one control plane function, 'CPF' and at least one data plane function, 'DPF', wherein during runtime and in case of a predefined state of a first DPF, '1-DPF', at least one existing subscription context, 'SC', of the 1-DPF and associated data-plane traffic is offloaded to a second DPF, '2-DPF', wherein the predefined state may represent an overload of the 1-DPF.

The term "computing device", "transport network entity", "transport node", "network node", "network entity", or the like refers each to a device adapted to perform computing like a personal computer, a tablet, a mobile phone, a server, a router, a switch, or the like and comprises one or more processors having one or more cores and may be connectable to a memory for storing an application which is adapted to perform corresponding steps of one or more of the embodiments of the present invention. Any application may be software based and/or hardware based installed in the memory on which the processor(s) can work on. The devices or entities may be adapted in such a way that the corresponding steps to be computed are performed in an optimized way. For instance different steps may be performed in parallel with a single processor on different of its cores. Further the devices or entities may be identical forming a single computing device.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The term "overload" refers to a situation of a device, for example a computing device, in which the processor and/or memory capacity cannot, can only partly or only with a delay handle incoming requests, traffic or the like based on the resources provided by the device. The determination of an overload may not only be dependent on the physical resources but may also be based on a predefined parameter: For instance an "overload" is determined when the memory used exceeds a certain threshold, when the incoming traffic exceeds a certain threshold or the like. Overload can e.g. appear to resources associated with a physical network function as well as to resources associated with a VNFC.

The term "runtime" refers to a computing entity or computing device on which one or more processes, procedures, methods or the like are at the moment run, being executed, performed, processed, operated or serviced. Pertaining to a DPF, the term "runtime" refers in particular to subscriber context and associated data traffic, which are currently handled by the DPF.

The term "state" refers to a situation of an entity or device being represented by certain values of one or more parameters of the entity or device.

At least one embodiment of the present invention may have at least one of the following advantages: already existing subscription context can be offloaded; already existing data-plane traffic can be offloaded from the overloaded DPF; load from an overloaded DPF can be distributed between one or more other DPFs; offload can be kept transparent, i.e. is not visible to other network functions; session continuity is supported; packet loss and re-ordering of packets can be reduced or even avoided; fast scaling of DPFs, i.e. scale-out and scale-in Further features, advantages and further embodiments are described and are apparent from the disclosure herein.

A 2-DPF may be instantiated solely for handling a SC. This saves network resources while enabling a fast offload in case of an overload of a DPF. Further this enables also a handling of a large number of offloaded SC.

A group of SC associated with a group parameter may be offloaded to the 2-DPF. This enables to offload a group of SC having a group parameter in common, i.e. enables to offload similar SC.

The group parameter may be an IP address endpoint to serve offloaded SC and associated data-plane traffic with a common forwarding tunnel. For example the group which is transferred from the 1-DPF to the 2-DPF has in common that it uses a common IP address endpoint on 1-DPF to serve a forwarding tunnel. All subscriptions of 1-DPF sharing a certain IP address as GTP-U tunnel endpoint are transferred to 2-DPF and 2-DPF configures then a network interface to use the imported tunnel endpoint IP address from 1-DPF.

In case of virtualized DPF, the 2-DPF may be located in a computation device other than the 1-DPF. 2-DPF is, for example, located on a different host server and enables data-plane offload from the host server which holds the 1-DPF instance.

In case of the 1-DPF and the 2-DPF being represented by physical network entities, the 2-DPF may be located in a separate network part being different from the network part of the 1-DPF. This enables a better distribution of the offloaded SC within the network when the 2-DPF is located in a separate network branch.

The group of SC may be selected such to minimize the amount of SC to be transferred from the 1-DPF to the 2-DPF and/or to minimize the volume of data-plane traffic associated with the group to be rerouted due to offloaded SC. This allows minimize the amount of SC which is to be transferred to the 2-DPF saving bandwidth while minimizing the data traffic volume minimizes rerouting, i.e. network impact of the offloaded SC.

Transport network entities of the network may be informed to indirect traffic to the 2-DPF and the transport network entities implement a corresponding aggregated forwarding rule to indirect the traffic, wherein the transport network entities may be informed to indirect the traffic by a enforcement indicating message. For instance the local transport network nodes are instructed from a network controller to indirect traffic to the migrated endpoint towards the 2-DPF. This can be accomplished by an aggregated rule at the local transport network nodes, for example data center switches or routers: The result is a deviation from the default rules in the local transport network nodes to forward traffic which is originally destined to a certain IP-address to 1-DPF to 2-DPF instead. Other traffic towards other IP addresses for example is still forwarded to 1-DPF.

When the 1-DPF is not overloaded anymore, the offloaded SC may be transferred back to the 1-DPF from the 2-DPF. This enables a flexible handling to cope with overload situations in DPF. Also network resources are released when the overload situation is not present anymore.

The 2-DPF may buffer received or captured data associated with the offloaded SC. Buffering reduces the probability of packet loss and in particular mitigates or eliminates re-ordering of data during offload from the 1-DPF to the 2-DPF.

A control indication indicating successful enforcement of indirection of data-plane traffic to the 2-DPF by the transport network entities may be provided. This enables a reliable offload since a control indication is sent after successful indirection to the 2-DPF.

The control indication may be sent as last data associated with the offloaded SC to the 1-DPF and then to the 2-DPF wherein the last data may be provided in form of packet and/or identified by an IP- or MAC-address. A control indication may therefore be provided to the 1-DPF indicating to the 1-DPF that indirection of offloaded traffic is enforced and the control indication is the last packet associated with the offloaded traffic that the 1-DPF receives on this interface. The 1-DPF can then indicate to 2-DPF to forward buffered packets. This enables a reliable offload, avoids re-ordering of packets associated with offloaded traffic and enables to treat the control indication as exception for indirection at a transport network entity and the packet may be identified by the source IP- or MAC-address. For example if the CPF generates the packet comprising the control indication, the transport network node can identify the exception packet based on the CPF's IP- or MAC-address which is carried in the packet source IP-address field or MAC-address field respectively and still forward the control indication to 1-DPF. At reception of the control indication, 1-DPF can send a control indication or a different indication to 2-DPF to initiate the release of buffered packets.

Upon reception of a process indication the 2-DPF may process all buffered data of the offloaded SC, wherein the process indication may be provided in form of the control indication. Then at the reception of the control indication 2-DPF knows that there is no further data, e.g. packet arriving for the offloaded SC and upon reception of the control indication the 1-DPF instructs the 2-DPF to process and forward all buffered data of the offloaded group.

The predefined state may represent an overload of the 1-DPF. This enables to distribute traffic to other DPFs in case resources of the 1-DPF cannot handle anymore incoming requests in a certain time, e.g. data requests are delayed such that a certain Quality of Service and/or Quality of Experience level cannot be achieved anymore. Further if SC and associated data traffic is also offloaded to a second DPF and the first and second DPF now are in a so-called "underload" state, i.e. a single DPF can handle incoming requests, no second DPF is necessary, offloaded SC and associated data traffic can be retransferred from the second DPF to the first DPF and thus enabling resource savings.

IP addresses given to mobile devices may be grouped into IP address blocks by the 1-DPF, wherein an IP address block is associated with a forwarding tunnel endpoint by its IP-address endpoint. This provides each tunnel endpoint IP address being assigned to one or multiple mobile device IP address blocks. In such case, a mobile device's IP address can be unambiguously assigned to an IP address block and the associated forwarding tunnel with its tunnel endpoint IP address. After offload, for instance a northbound switch can enforce an aggregated rule to identify offloaded data-plane traffic based on the mobile devices IP address block and indirect all packets, which are destined to an IP address of that block, towards 2-DPF. Moving data traffic associated with a tunnel endpoint to 2-DPF allows identification of downlink data traffic, which uses this tunnel, by means of an IP address block. This enables aggregation of rules to detect traffic for indirection not only at the southbound switch (uplink traffic using a tunnel endpoint IP address), but also for downlink traffic at the northbound switch (all traffic destined to mobile device addresses from a given IP address block).

Figure 6:
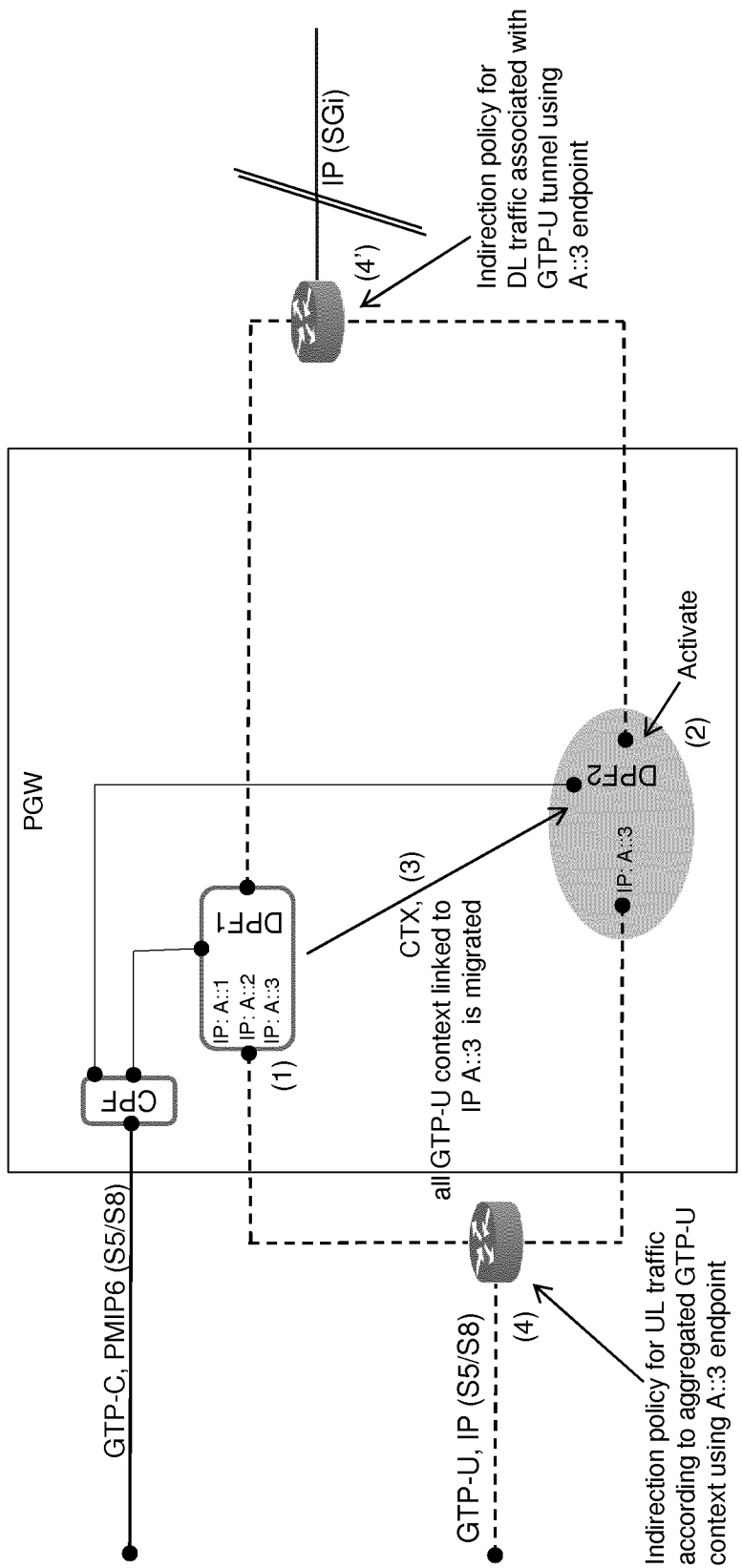
FIG. 6 illustrates part of a system according to an embodiment of the present invention.

FIG. 6 shows part of a system according to an embodiment of the present invention.

In FIG. 6 the transfer of a group of subscriptions as well as data-plane traffic and associated data-plane endpoints from 1-DPF to 2-DPF is shown. The process to transfer a context is called Context Transfer CTX In FIG. 6 packet data network gateway PGW is shown comprising control plane function CPF and two data-plane functions DPF1 and DPF2. Further the data-plane functions DPF1 and DPF2 have an interface for uplink UL traffic 4 and an interface for downlink DL traffic 4'. The control plane function has a GTP-C interface and/or a PMIP6 interface on the S5/S8 reference point.

In FIG. 6 DPF1 is associated with IP-addresses A::1, A::2 and A::3. A transport network 4 for uplink traffic in the transport network node 4' for downlink traffic has an indirection policy for uplink traffic respectively downlink traffic according to aggregated GTP-U context using A::3 endpoint. All GTP-U context linked to IP A::3 is indirected from DPF1 to DPF2 which is then activated. In more detail:

Newly instantiated DPFs can not only serve new registrations, but can import subscription context of a group of registrations of another, overloaded DPF. Such a scenario is shown in FIG. 6 in the view of a network as shown in FIG. 5: DPF2 imports context of an overloaded DPF1. Further in FIG. 6 the group which is transferred from one DPF, here DPF1 to another DPF, here DPF2 has in common that it uses a common IP address endpoint to serve a forwarding tunnel. All subscriptions of DPF1, which share IP address A::3 as GTP-U tunnel endpoint, are transferred to DPF2. DPF2 configures a network interface to use the imported tunnel endpoint IP address A::3 from DPF1. This may turn A::3, which was topologically correct at DPF1, into a topologically incorrect address at the importing DPF2.

In case of virtualized DPFs, DPF2 may be located on the same host server as DPF1 or on a different host server. A DPF2 on a different host server enables Data-Plane offload from the host server, which holds the DPF1 instance. In case DPFs are represented by physical network components, selection of a DPF2 in a separate network branch other than DPF1 enables better distribution of load in the transport network.

DPF2, which imports the offloaded subscription context to serve offloaded Data-Plane traffic, can be a dedicated instance of a Data-Plane VNFC, solely to take over some load from DPF1, or it can be an already existing DPF, which has been previously instantiated during scale-out to take new registrations.

A group, which is to be offloaded from DPF1 to DPF2, can be selected in the view of reducing the amount of context which is to be transferred to DPF2. Alternatively, a group can be selected based on the volume of Data-Plane traffic associated with that group of subscribers.

When DPF2 starts serving as endpoint using IP address A::3, the local transport network nodes 4 are instructed e.g. from a network controller to indirect tunneled uplink traffic to the migrated endpoint towards DPF2. This can be an aggregated rule at local transport nodes (e.g. data center switches/routers). It is deviated from default rules in the local transport network to forward traffic, which is destined to IP address A::3 to DPF1 to DPF2 instead. Other traffic towards A::1 and A::2 is still be forwarded to DPF1. Then load on DPF1 is reduced and DPF2 takes over serving all Data-Plane traffic, which is using A::3 as forwarding/tunnel endpoint, on the S5 reference point. The same applies to the SGi reference point in that example: DPF2 takes over responsibility to process received/captured downlink packets. Indirection of downlink packets to DPF2 instead of DPF1 can also be accomplished using instructions from a network control functions to transport network nodes 4', as depicted in FIG. 6. This mechanism or procedure enables runtime offload of existing subscriptions from an overloaded DPF to a DPF, which can take that load. As result, DPF1 can continue serving the Data-Plane of the remaining forwarding endpoints using A::1 and A::2, whereas DPF2 serves traffic of endpoint A::3.

The method can be used to serve the PGW scaling temporarily and avoid overload and failure of a DPF. After network load situation improves, the process can be reversed and the subscription context as well as the Data-Plane traffic can be transferred back to the original DPF (DPF1 in the example of FIG. 6). This allows also removal of indirection states in the transport network (nodes 4 and 4' respectively), which enabled indirection of traffic towards the importing DPF, i.e. DPF2.

The DPF2 can be a dedicated DPF, which has been instantiated solely to handle offloaded traffic. Alternatively, DPF2 can be a previously instantiated DPF, which has been assigned new subscriptions. In case the existing DPF2 is underutilized, it may be used to import context and handle offloaded traffic from DPF1.

Runtime offload of a group of data flows between DPFs implies the possibility of packet re-ordering, as some packets of the offloaded Data-Plane context may still be in service of DPF1, whereas DPF2 already receives packets associated with the imported context. The effect of re-ordering depends on many factors, such as DPF1 load and associated latency to progress packets which are still directed to DPF1, though DPF2 is already serving the offloaded group's context and Data-Plane. Also the transport network performance and topology may influence the amount of re-ordering of packets.

Figure 7:
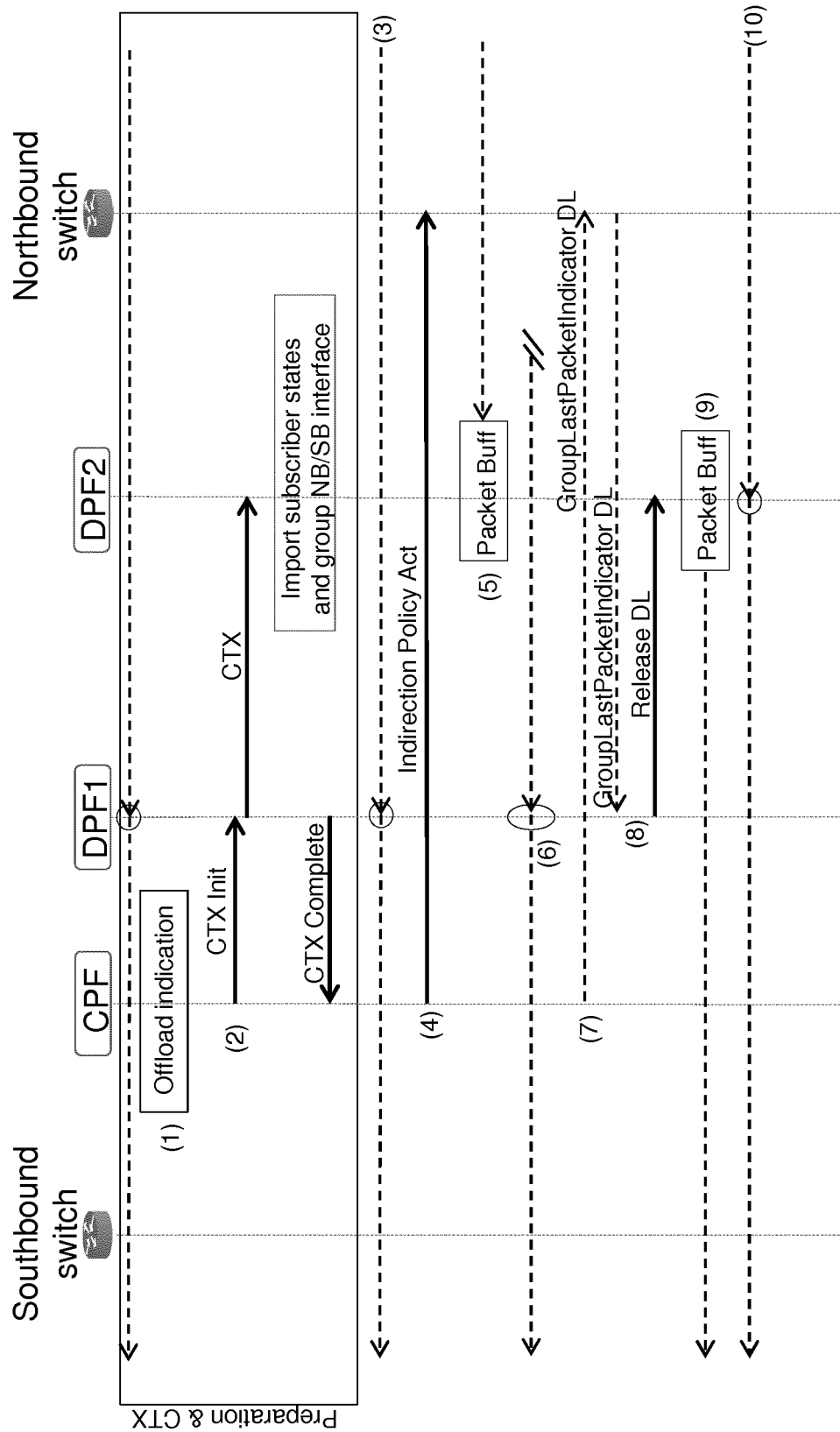
FIG. 7 illustrates part of the method according to a further embodiment of the present invention.

In FIG. 7, a method for compensation of re-ordering of data-plane packets associated with the context of offloaded subscription group, here as example in downlink direction, according to an embodiment is shown.

In the embodiment of FIG. 7, packet re-ordering of packets associated with a large group of offloaded data flows is reduced or even eliminated:

In detail, after offloaded context has been transferred (step (1) and step (2)) and DPF2 is ready to serve the imported context and associated Data-Plane traffic (step (3)), transport nodes are instructed to indirect traffic associated with offloaded context towards the importing DPF DPF2 (step (4)). This step (4) may be performed by transmitting an enforcement indicating message for instructing or indicating to indirect the traffic. In the example of FIG. 7, the CPF is in charge to enforce such indirection policy in the transport network nodes, which are denoted as southbound (SB) switch for the traffic serving the S5 reference point, and northbound (NB) switch serving the SGi reference point. Other sources for the transport network control are possible and other transport network nodes (single ones, distributed indirection policies) are possible. The example of FIG. 7 illustrates the method for the compensation of downlink traffic re-ordering. The same applies to uplink traffic. The transfer of context between DPF1 and DPF2 can be accomplished by a direct communication, e.g. using a TCP connection between DPF1 and DPF2. Alternatively, the CPF can retrieve context from the DPF1 and convey it to DPF2. Since the offloaded context will comprise a large amount of context information, multiple TCP segments or IP packets can be used.

Transport network nodes for traffic indirection may enforce aggregated rules to identify traffic, which is to be indirected towards DPF2. This reduces the number of entries required in the transport network nodes to perform traffic indirection. For uplink traffic, all traffic directed to the IP tunnel endpoint IP address, which is transferred from DPF1 to DPF2, can be identified by sharing the same destination IP address of the tunnel endpoint. The relevant switch in the example to identify uplink traffic and enforce the indirection rule, is the southbound switch.

To identify downlink traffic, which is to be indirected towards DPF2, as shown in FIG. 7 the northbound switch, the IP address of each mobile device, whose subscription context and data traffic has been offloaded to DPF2, can be used as key to identify. This results in a large amount of entries in the transport node.

Alternatively the following can be done to enable the use of aggregated rules for traffic identification: Referring to FIG. 6, three interfaces and IP addresses are used at DPF1 to terminate forwarding tunnels. DPF1 needs to identify received downlink traffic based on the mobile device's IP address and select the correct tunnel for further forwarding. IP addresses, which are given to mobile devices, can be organized in blocks. On DPF1, each tunnel endpoint IP address is assigned one or multiple mobile device IP address blocks. In such case, a mobile device's IP address can be unambiguously assigned to an IP address block and the associated forwarding tunnel with its tunnel endpoint IP address. After offload, the northbound switch can enforce an aggregated rule to identify offloaded Data-Plane traffic based on the mobile devices IP address block and indirect all packets, which are destined to an IP address of that block, towards DPF2.

When DPF2 starts serving the offloaded traffic, DPF2 buffers received/captured Data-Plane packets which are associated with the offloaded context (step (5)). DPF1 may still receive or process Data-Plane packets associated with the offloaded group (step (6)).

After the transport network has been instructed to indirect Data-Plane packets towards DPF2, a control indication indicating successful enforcement of indirection of data-plane traffic, e.g. a special Control indication packet, here the so-called GroupLastPacketIndicator is sent towards the DPF1 Data-Plane endpoint which served the offloaded Data-plane traffic (step (7)). The GroupLastPacketIndicator can be generated by the CPF after the CPF ensured that the indirection rules are being enforced by the transport network. Alternative sources for the GroupLastPacketIndicator are possible.

For uplink traffic, the GroupLastPacketIndicator is e.g. an IP packet, which is addressed to the IP address of DPF1's tunnel endpoint, which has been transferred to DPF2. The GroupLastPacketIndicator packet can be sent via the same transport node which is instructed to indirect offloaded Data-Plane packets on the uplink (southbound switch). For downlink traffic per the example in FIG. 7, the GroupLastPacketIndicator is e.g. an IP packet, which is addressed to an IP address from the mobile device IP address block which has been transferred to DPF2 or to an IP address associated with the DPF1 interface which serves the SGi reference point. The GroupLastPacketIndicator packet is treated as exception at the transport network switches and can still be forwarded to the endpoint at DPF1 that serves the offloaded traffic beforehand (step (8)). This ensures that the GroupLastPacketIndicator traverses the same path in the transport network from the indirection transport network node to the DPF1 which has been used by the Data-Plane packets before offload and consequently that the GroupLastPacketIndicator packet is the last Data-Plane packet associated with the offloaded traffic and served by the DPF1 in one direction (downlink direction shown in the example of FIG. 7). The same mechanism or method applies to uplink traffic. To treat the GroupLastPacketIndicator packet as exception for indirection at the transport node, the packet can be identified by the source IP or MAC address. For example: if the CPF generates the GroupLastPacketIndicator packet, the transport node can identify the exception packet based on the CPF's IP or MAC address which is carried in the packet's source IP address field or MAC address field respectively.

The GroupLastPacketIndicator packet needs to be processed by the DPF1 and not be forwarded. This can be achieved by using the DPF1's IP address of the interface, which receives the offloaded Data-Plane traffic, as destination address. The DPF1 will deliver the packet to a local process. Separate GroupLastPacketIndicator packets should be sent to the DPF1 to mitigate re-ordering of uplinks and downlink packets: One towards the DPF1's interface that terminates uplink traffic on the tunnel endpoint IP address, which is has been transferred to DPF2. Another GroupLastPacketIndicator message is sent to the DPF1's interface which proxies and receives downlink packets destined to mobile devices, whose context and Data-Plane traffic has been transferred to DPF2. The GroupLastPacketIndicator packet may be inserted into the same queue on DPF1 as the offloaded uplink and downlink traffic. This ensures that the DPF1 can identify the last packet of the offloaded Data-plane for uplink and downlink respectively.

After DPF1 processes the GroupLastPacketIndicator packet for downlink direction, the DPF1 knows that there no further packet arriving on the downlink for the offloaded group. At the reception of the GroupLastPacketIndicator for the downlink, the DPF1 instructs the DPF2 to process and forward all buffered downlink packets of the offloaded group (step (9)). Also a separate or different packet or message from the GroupLastPacketIndicator, a so-called process indication or process indication message may be used to instruct processing according to step (9). On the S5 reference point, downlink packets will appear in the correct order (step (10)).

The same mechanism/method applies to compensate re-ordering of the offloaded group's uplink packets. Sending the GroupLastPacketIndicator packets may happen simultaneously and as soon as possible after traffic indirection policies have been activated. This optimizes and reduces the number of packets which need to be buffered for downlink and uplink on DPF2.

Though the example of FIG. 7 above refers to a virtualized PGW, the same mechanism/method applies to virtualized SGWs. In that case, the SGW DPFs use tunnel endpoint IP addresses for forwarding of Data-Plane traffic on both reference points, towards the eNodeB and towards the PGW. The aggregation of traffic indirection rules is simplified in such case, where the tunnel endpoint IP addresses, which are transferred from DPF1 to DPF2, can serve as common key to identify both, uplink and downlink traffic.

The mechanism/method of the embodiments of the present invention support also scale-in of Data-plane VNFs. In such case, the objective is to terminate a Data-Plane VNFC to save resources. The subscriptions which are hold by the DPF VNFC, which should be terminated, can be transferred to a different DPF VNFC. After the DPF is relieved from subscription context and Data-Plane traffic, it can be shut down.

Figure 8:
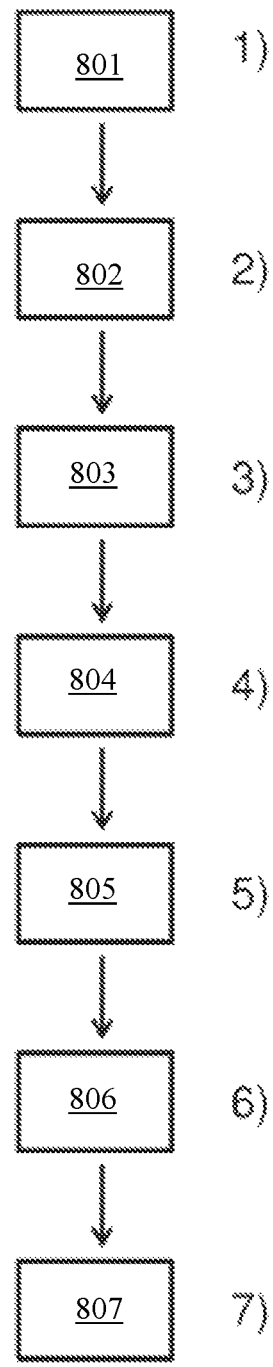
FIG. 8 illustrates steps of a method according to further embodiment of the present invention.

FIG. 8 shows steps of a method according to further embodiment of the present invention.

In FIG. 8 a method for transparent scaling of virtualized network functions is shown.

1) Runtime offload 801 of groups of Data-plane context and traffic between Data-Plane functions.

2) Identifying 802 a Data-Plane function's subscription group, which shares a forwarding/tunnel endpoint (e.g. GTP-U IP address).

3) Transfer 803 of this group's subscription context from one Data-Plane function to another Data-Plane function, which imports the context and Data-Plane forwarding/tunnel endpoints.

4) Enforcement 804 of transport network policies which result in the indirection of offloaded Data-Plane traffic to the importing Data-Plane function's imported Data-Plane forwarding/tunnel endpoint.

5) Buffering 805 the packets associated with the offloaded group's Data-Plane at the importing Data-Plane Node.

6) Issuing 806 a control packet (GroupLastPacketIndicator), which traverses the indirection transport network nodes up to the original offloading Data-Plane function Data-Plane endpoint.

7) At reception of the GroupLastPacketIndicator packet at the offloading Data-Plane function, instructing 807 the importing Data-Plane function to release the buffered packets.

Embodiments of the present invention enable or provide: Fast scaling of Data-Plane functions (scale-out and scale-in); Offloading of already established subscription context and Data-Plane traffic from overloaded Data-Plane functions; Compensation of Data-Plane re-ordering for the complete offloaded group; and Enabler for service continuity and mechanism to meet agreed service levels (SLA) during unexpected load increase Furthermore, embodiments of the present invention enable: Runtime offload of a group of Data-Plane flows and associated subscriptions; VNF intrinsic scaling, which is kept transparent (not visible) to other VNFs; and Enabler for fast scale-out and scale-in during unexpected changes in the load situation.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a network with data-plane and control-plane separated network functions, wherein a network function of the network functions comprises network function components, the network function components comprising a control plane function and data plane functions, wherein, during runtime and in response to a predefined state of a first data plane function, of the data plane functions, occurring, a group of multiple subscription contexts of the first data plane function and associated data-plane traffic are offloaded to a second data plane function, of the data plane functions, the predefined state being a detected overload of the first data plane function,
wherein the group of multiple subscription contexts share a common internet protocol-address (IP-address) endpoint to serve the offloaded group of subscription contexts and their associated data-plane traffic with a common forwarding tunnel.

2. The method according to claim 1, wherein the second data plane function is instantiated based on the detected overload of the first data plane function.

3. The method according to claim 1, wherein in case of virtualized data plane functions, the second data plane function is located on a computation device other than the first data plane function.

4. The method according to claim 1, wherein in case of the first data plane function and the second data plane function being represented by physical network entities, the second data plane function is located in a separate network part being different from the network part of the first data plane function.

5. The method according to claim 1, wherein the group of subscription contexts is selected to minimize the amount of the subscription contexts to be transferred from the first data plane function to the second data plane function.

6. The method according to claim 1,
wherein transport network entities of the network are informed to route traffic to the data plane function, and the transport network entities implement a corresponding aggregated forwarding rule to route the traffic, and
wherein the transport network entities may be informed to route said traffic by an enforcement indicating message.

7. The method according to claim 1, further comprising:
determining that the first data plane function is no longer overloaded,
based thereon, returning the group of offloaded subscription contexts to the first data plane function from the second data plane function.

8. The method according to claim 1, wherein the second data plane function buffers received or captured data associated with the offloaded subscription context.

9. The method according to claim 8, wherein upon reception of a process indication, the second data plane function processes all buffered data of the offloaded subscription context.

10. The method according to claim 1, wherein a control indication indicating successful enforcement of routing of data-plane traffic to the second data plane function by transport network entities is provided, wherein the control indication is sent as last data associated with the group of offloaded subscription contexts to the first data plane function and then to the second data plane function, and wherein the last data is provided in a form of a packet or is identified by an internet protocol address (IP-address) or media access control address (MAC-address).

11. The method according to claim 1,
wherein IP addresses given to mobile devices are grouped into internet protocol (IP) address blocks by the first data plane function, and
wherein an IP address block of the IP address blocks is associated with a forwarding tunnel endpoint by its IP-address endpoint.

12. A network of multiple computing systems, each of the computing systems comprising one or more processors, the network configured to perform the method of claim 1.

13. The network according to claim 12, wherein internet protocol (IP) addresses given to mobile devices are grouped into IP address blocks by the first data plane function, and
wherein an IP address block of the IP address blocks is associated with a forwarding tunnel endpoint by its IP-address endpoint.

14. A non-transitory computer readable medium storing a program causing a computer to execute the method of claim 1.

15. The method of claim 1, further comprising:
using the common forwarding tunnel to serve each member of the offloaded group of subscription contexts.

16. The method of claim 1, further comprising importing the common IP-address endpoint from the first data plane function to the second data plane function.

17. A method for operating a network comprising data-plane and control-plane separated network functions, the method comprising:
determining that a first data plane function, of the network functions, has experienced an overload,
in response to determining that an overload has occurred, selecting multiple subscription contexts of the first data plane function based on their respective internet protocol-address (IP-address) endpoints; and
offloading the selected subscription contexts from the first data plane function to a second data plane function, of the network function;
wherein the offloaded subscription contexts share a common IP-address endpoint such that a common forwarding tunnel can serve each of the offloaded subscription contexts.

18. The method of claim 17, further comprising:
serving each of the offloaded subscription contexts with the common forwarding tunnel.

19. The method of claim 17, wherein the selected subscription contexts are offloaded from the first data plane function to the second data plane function in parallel.

20. The method of claim 17, further comprising importing the common IP address endpoint from the first data plane function to the second data plane function.

* * * * *